United States Patent Office 3,499,242
Patented Mar. 10, 1970

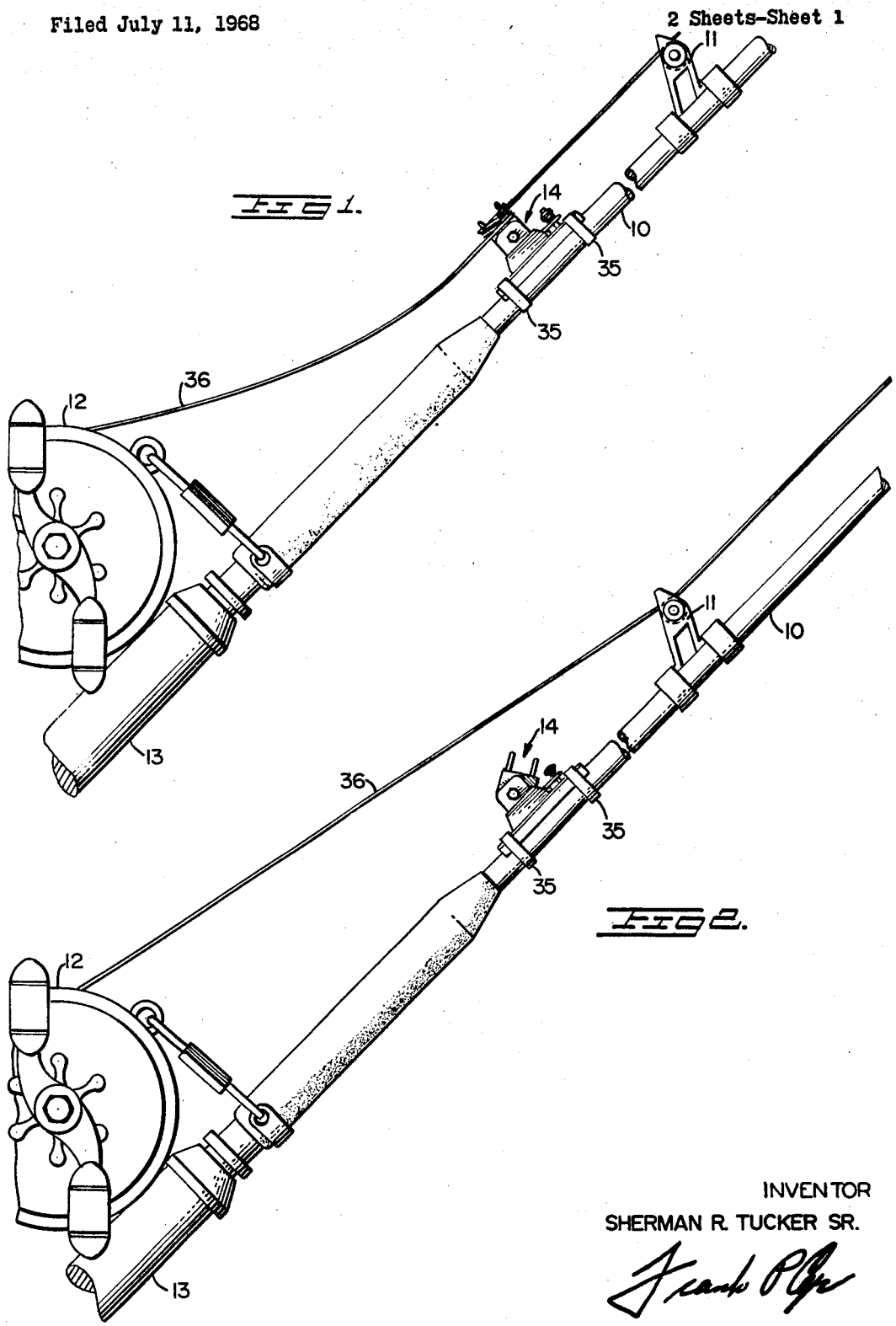
March 10, 1970    S. R. TUCKER, SR    3,499,242
FISHING APPLIANCE
Filed July 11, 1968    2 Sheets-Sheet 1
INVENTOR
SHERMAN R. TUCKER SR.
ATTORNEY

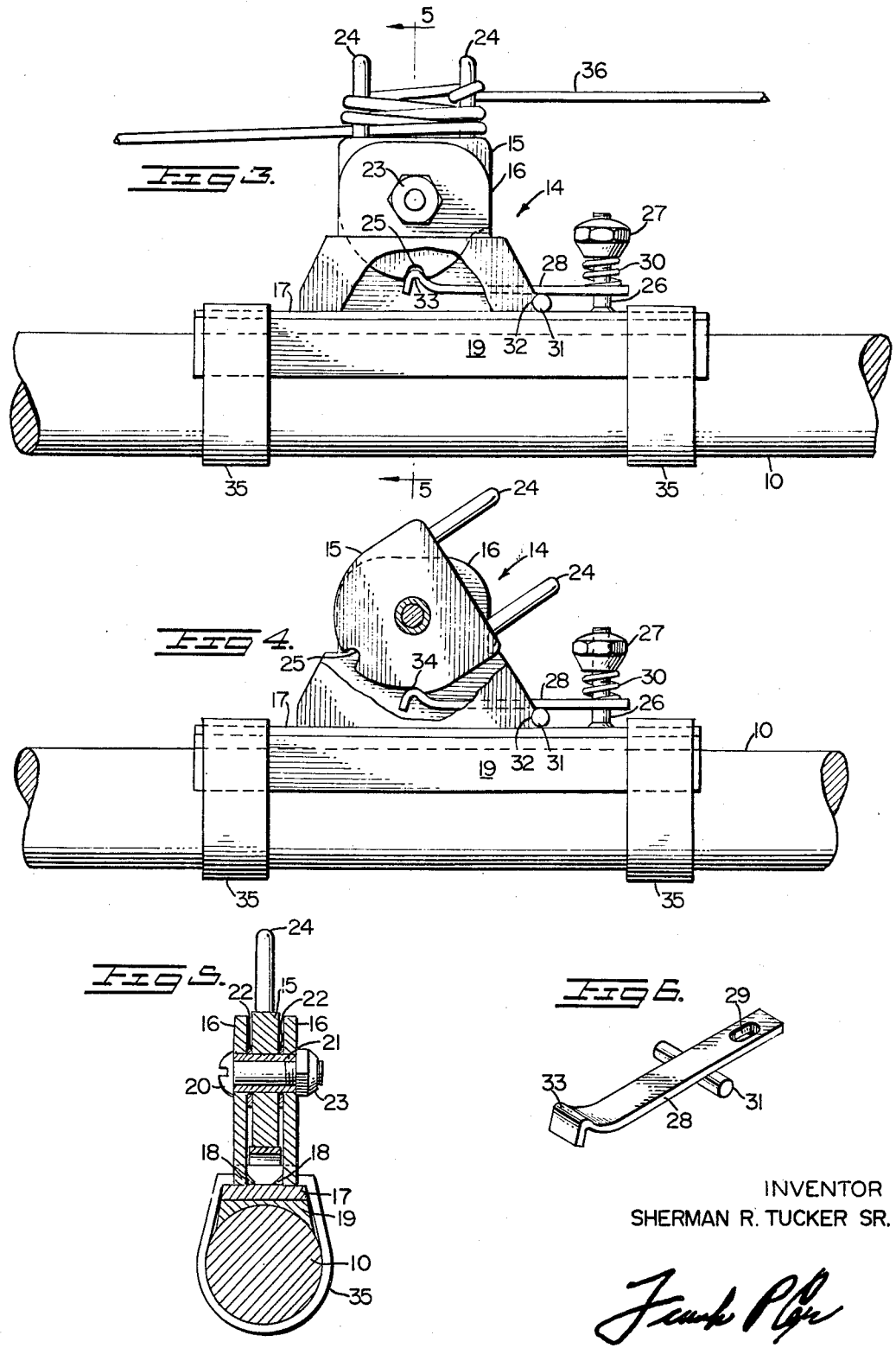

3,499,242
FISHING APPLIANCE
Sherman R. Tucker, Sr., 578 Magnolia Ave.,
Eu Gallie, Fla. 32935
Filed July 11, 1968, Ser. No. 744,177
Int. Cl. A01k 87/00
U.S. Cl. 43—25  4 Claims

ABSTRACT OF THE DISCLOSURE

A fishing line holder mounted on a fishing rod, or a reel or to any other surface adjacent said rod and/or reel. The holder comprises a cam plate pivoted on a base member, the cam plate having line-holding means on one edge thereof and a cam notch on the opposite edge engaged by an adjustably-tensioned, fulcrumed spring to hold the cam plate in holding position. When a fish pulls on the line, the tensioned spring is released from the cam notch allowing the cam plate to pivot to release the fishing line so that the fish is effectively hooked when the angler engages the reel and "sets" the hook.

BACKGROUND OF THE INVENTION

Numerous attempts have been made heretofore for providing a convenient and effective means for holding a line and bait being trolled thereby and to release the line immediately when a fish strikes at the bait, whereby a certain amount of slack will be presented thus enabling the striking fish to capture the bait naturally. However, all such prior devices have fallen short of their intended usages. Therefore, it is with this in mind that I have provided a structure of improved characteristics which will overcome all such prior deficiencies.

One of the main objects of the invention is to provide a fishing line holder which is readily adaptable to a fishing rod, a fishing reel, or to any convenient support means in close proximity to the rod and/or reel.

Another object of the invention is to provide a fishing line holder whereby the amount of pull required to effect the release of the line and to permit for the reel to run in free spool can be readily adjusted by the user thereof whenever required.

Another object of the invention is to provide a device which is intended to function as an outrigger line attachment to a rod which is employed in the trolling of a flat-line bait.

Another object of the invention is to provide a fishing line holder which is adapted to be operatively associated with a fishing reel which is left in free spool and which, upon the striking of the bait by a fish, will release the line to thus afford a time sufficient for the bait to be well taken in the mouth of the striking fish and to thus insure proper setting of the hook in the mouth of the fish.

Another object of the invention is to provide a release for a fishing line whereby the amount of pull on a baited hook for releasing said line can be conveniently adjusted so as to compensate for the drag thereon caused by the speed of a trolling boat, chop of the water, size of bait being used, etc.

A further object of the invention is the provision of a fishing line holder and line release mechanism which is simple in its contruction, thoroughly reliable and efficient in operation, readily and easily controlled, strong and inexpensive to manufacture.

With these and other objects in view, the invention consists in the features of consrtuction and the combination and arrangement of parts as will be hereinatfer more fully described, illustrated in the accompanying drawings which disclose the preferred embodiment of the invention, and pointed out in the claims hereunto appended.

DESCRIPTION OF THE DRAWINGS

FIGURE 1 is a side elevational view showing the fishing line wound about the pins of my line release mechanism.

FIGURE 2 is a side elevational view showing the fishline released from the pin holders.

FIGURE 3 is an enlarged sectional view with parts broken away showing the line release mechanism in cocked position.

FIGURE 4 is an enlarged sectional view with parts broken away showing the line release mechanism in line released position.

FIGURE 5 is a section taken on line 5—5 of FIGURE 3, looking in the direction of the arrows, and, FIGURE 6 is a perspective view of the leaf spring employed with my line release mechanism.

PREFERRED EMBODIMENT OF THE INVENTION

Before describing the specifics of the structure employed with the invention, it should be pointed out that the invention will probably be found most advantageous for flat line fishing. Flat line fishing occurs when an angler trolls a bait usually from the stern of a boat where the rod and reel is often held in a rod socket thereon and the reel is usually left in locked or set position so that the bait is advanced through the water or is caused to skim on the surface thereof, and the line on the reel is prevented from unreeling therefrom. However, when a fish strikes at the trolled bait, the angler must immediately set the reel in free spool so as to permit the bait to stay where it was struck to thus permit the fish to chew or swallow the bait, and thence the reel is set in gear or locked position thus enabling the angler to exert a backward pull on the rod to set the hook in the mouth of the fish. The immediate release of the fishing line when the bait is struck by a fish is most critical, particularly when fishing for bill fish, such as sailfish, marlin, etc. When a bill fish strikes at a moving bait, it does so first by swinging his bill at the bait to thus stun or kill the bait. Following the stunning or killing of the bait, the bill fish will then swallow the bait and once swallowed the hook can then be set. Thus, it becomes imperative when fishing for bill fish that some means be provided for the immediate release of the line at the time the fish strikes at the bait so as to enable the fish to swallow the same. The structure of the present invention insures for the immediate release of the line for more efficient fishing for fish of this type. Of course, when fishing for fish which immediately swallow a bait, without first stunning or killing the same, the structure to be described hereinafter is equally as efficacious since, once a bait is swallowed by a fish the same can be readily hooked by setting the swallowed bait and hook in the manner set forth above.

Referring now to the drawings, there is shown a conventional fishing rod 10 which may be made of fiberglass, steel shafting, etc. The rod 10 is provided with the customary roller guides 11 mounted in any known manner on the rod 10. A conventional clutch and brake reel 12 is secured in any known manner to the butt end 13 of the rod 10.

The structure of the present invention is shown generally at 14 and comprises a cam plate 15 which is rotatably mounted between a pair of side plates 16 which are either formed integral with or otherwise secured to an elongated base plate 17 as by a line of weld 18. Secured in any known manner to the undersurface of the base plate 17 is an elongated rod adapter 19 made of a suitable resilient material thus enabling the same to adapt itself to various diameter fishing rods.

As stated previously, the cam plate 15 is mounted for limited rotational movement between a pair of side plates 16. An externally threaded bolt member 20 extends between the side plates 16 and a bushing 21 extends through suitable openings formed in the side plates 16 and washers 22 are positioned intermediate the said side plates and the cam plate 15 as clearly shown in FIGURE 5 of the drawings. A self-locking nut 23 which may be of a type wherein the threads thereof are plastic lined threadedly engaging with the said bolt 20 for retaining the aforementioned cam plate in rotational mounting between the said side plates 16. With the arrangement of parts as aforesaid, it will be appreciated that the bushing 21 will limit the extent of travel of the nut 23 on the bolt 20, thus always insuring the free rotational movement of the cam plate on the bushing 21.

The cam plate 15 is provided along one side wall thereof with a pair of spaced bollard pins 24 and a cam notch 25 is provided along the opposite side wall as clearly shown in FIGURES 3 and 4 of the drawings. Formed integral with or otherwise secured to the base plate 17 is an upwardly-extending externally-threaded tension control stud 26 which cooperates with an internally threaded tension nut 27 to apply a tension to a leaf spring 28 in a manner to be more fully described hereinafter.

Leaf spring 28 comprises a flat elongated structure formed of any desired resilient material and is provided at one end thereof with an elongated slot 29 through which passes the aforesaid control stud 26, as clearly shown in FIGURES 3 and 4 of the drawings. A tension spring 30 is interposed between the tension nut 27 and the leaf spring 28, again as shown in FIGURES 3 and 4 of the drawings. A fulcrum pin 31 is secured in any manner to the undersurface of the leaf spring 28 and is adapted to engage with a notch 32 suitably formed along the lower edge of the side plates 16. A cam point 33 is formed along one end of the leaf spring and the same is adapted to engage with the aforesaid cam notch 25 in the cam plate 15 for retaining the cam plate in a cocked or upright position, shown more clearly in FIGURE 3 of the drawings. A cam stop 34 is provided on the cam plate 15 so as to limit the rotational movement of the plate when the same is caused to be rotated to the position shown in FIGURE 4 of the drawings.

It should be pointed out that all of the aforementioned parts, except for the rod adapter are preferably formed of a suitable noncorrosive metal or plastic so as to insure smooth operation of these various parts, notwithstanding the fact that they may be exposed to corrosive salt water spray and the like. As stated previously, the rod adapter is formed of resilient material such as plastic, rubber and the like so that the same will readily adapt itself to the external contour of various diameter fishing rods. To secure the aforesaid assembly to a fishing rod, tapes 35 are employed and as can be seen in FIGURES 3 and 4 of the drawings, the same extend over the base plate 17 and completely encircle the fishing rod. The ends of the tape may be secured to one another in any well-known manner.

In use, the fishing appliance is secured to a fishing rod in the manner described above. Following the attachment of the appliance to the rod, the fishing line 36 is wound back and forth across the bollard pins 24 in the manner shown more fully in FIGURE 3 of the drawings.

With the line thus positioned about the bollard pins, and with the cam point 33 engaging with the cam notch 25 in the cam plate 15, the tension nut 27 is threaded downwardly on control stud 26 until such time as sufficient tension has been applied on the slotted end of the leaf spring as to cause the cam point 33 to remain in engagement with the cam notch 25. When sufficient pull is exerted on the line leading to the bait the cam point becomes disengaged from the cam notch and the cam plate assumes the position shown in FIGURE 4 of the drawings, whereupon the line wound about the bollard pins is released. The angler can then put the reel into gear and then set the hook after sufficient line has been paid out.

Thus it will be seen that I have provided for a simple yet efficient structure for a line holding device which will permit the effective release of a bait being trolled by a flat line and which will be of material assistance to an angler in the successful hooking of a fish.

While I have shown and described the fishing appliance in association with a fishing rod, it is obvious that such can be secured to a reel or to some part of a boat, fishing pier, etc., it being necessary only that the appliance be in close proximity to the fishing rod. Also, while I have described the device particularly in association with flat line fishing as for bill fish, it is obvious that the same may be effectively employed in other types of fishing, such as drift fishing, still fishing, surf casting, and the like with conventional, spinning and other types of tackle.

While the above disclosure relates to a preferred and practical embodiment of the invention, it will be obvious to those skilled in the art, that the details of construction as well as the style of the fishing appliance may be modified.

I claim:

1. A fishing line holder comprising a base member mounted on a support, a pair of spaced side plate members on said base member, a cam plate mounted for limited rotational movement between said side plates, a cam notch formed in one wall of said cam plate, a fulcrumed spring, a cam point formed on one end of said spring engaging with said cam notch, a spring tensioning means mounted at the opposite end of said spring, a line holding means on said cam plate, said line holding means adapted to retain a line thereon and to release the same when a pull on said line is sufficient to disengage said cam point from said cam notch and to cause a limited rotational movement of said cam plate.

2. The structure of claim 1 wherein said spring tensioning means comprises a control stud formed on said base plate, said control stud extending through an opening in said fulcrumed spring, and a tension spring interposed between said fulcrumed spring and an adjustable member mounted on said control stud.

3. The structure of claim 2 wherein said support is a fishing rod and said base plate is provided with a resilient rod-engaging member.

4. The structure of claim 3 wherein said cam plate is mounted in spaced relationship between said side plates.

References Cited

UNITED STATES PATENTS

| 664,889 | 1/1901 | Ogimura | 43—25 |
| 2,650,448 | 9/1953 | Lichtig | 43—25 |
| 2,730,830 | 1/1956 | Smith | 43—25 |
| 2,730,832 | 1/1956 | Mathers | 43—43.11 |
| 3,136,086 | 6/1964 | Morrison | 43—43.11 X |
| 3,199,242 | 8/1965 | Holmstrom | 43—25 |

SAMUEL KOREN, Primary Examiner

D. J. LEACH, Assistant Examiner

U.S. Cl. X.R.

43—43.11, 43.12